Figure 5:
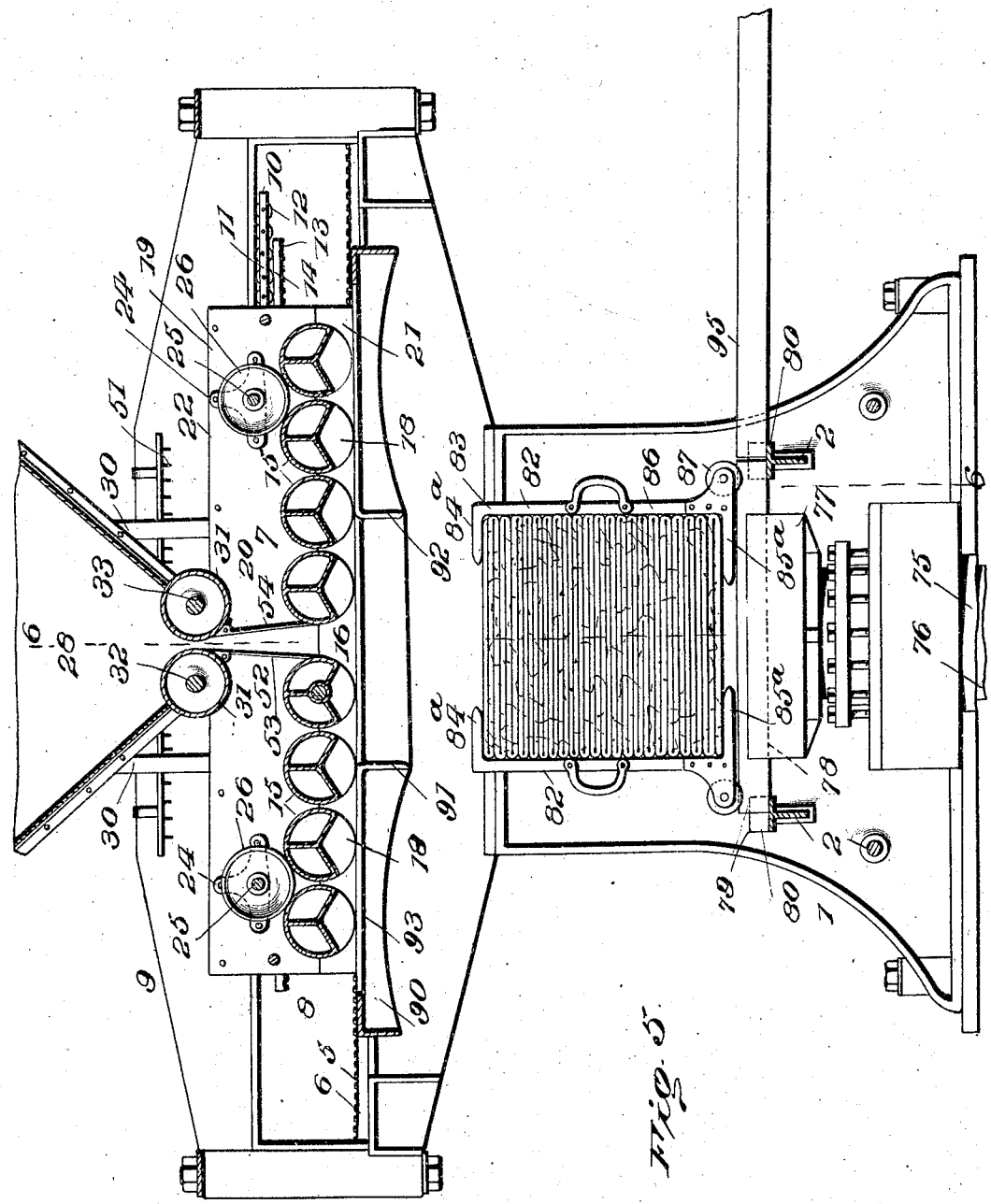

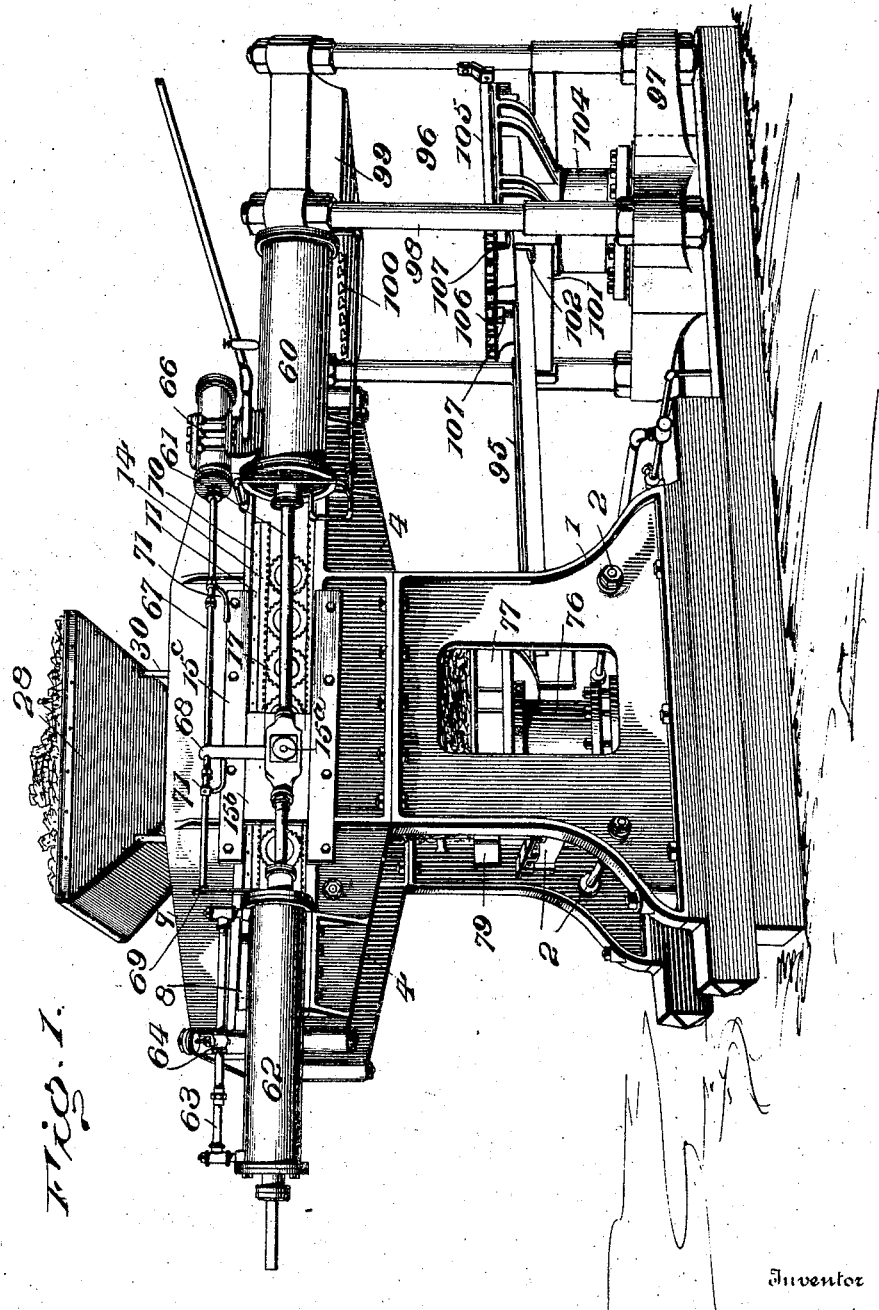

No. 785,068. PATENTED MAR. 14, 1905.
C. J. LUCE.
BALING PRESS.
APPLICATION FILED FEB. 27, 1904.
7 SHEETS—SHEET 2.
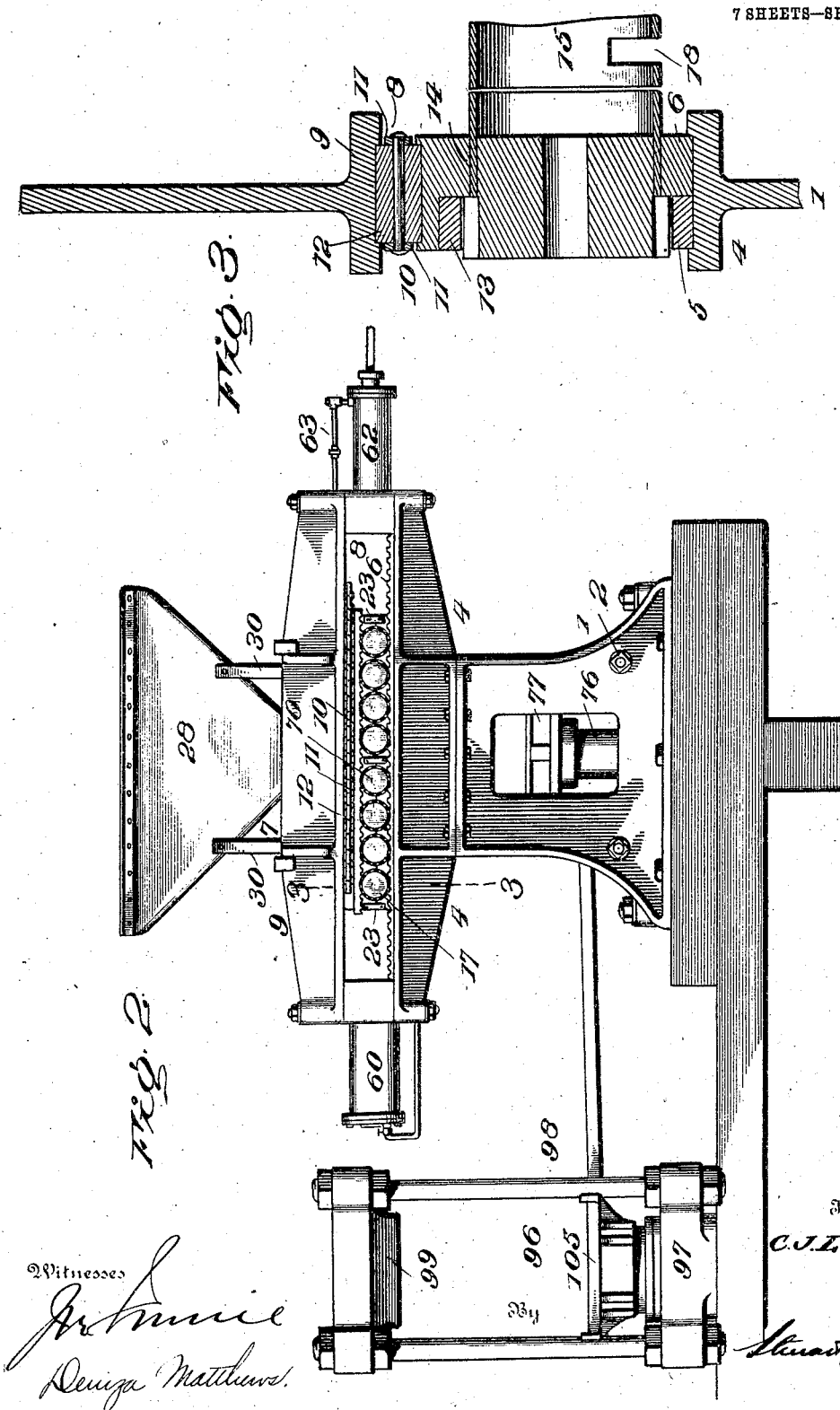

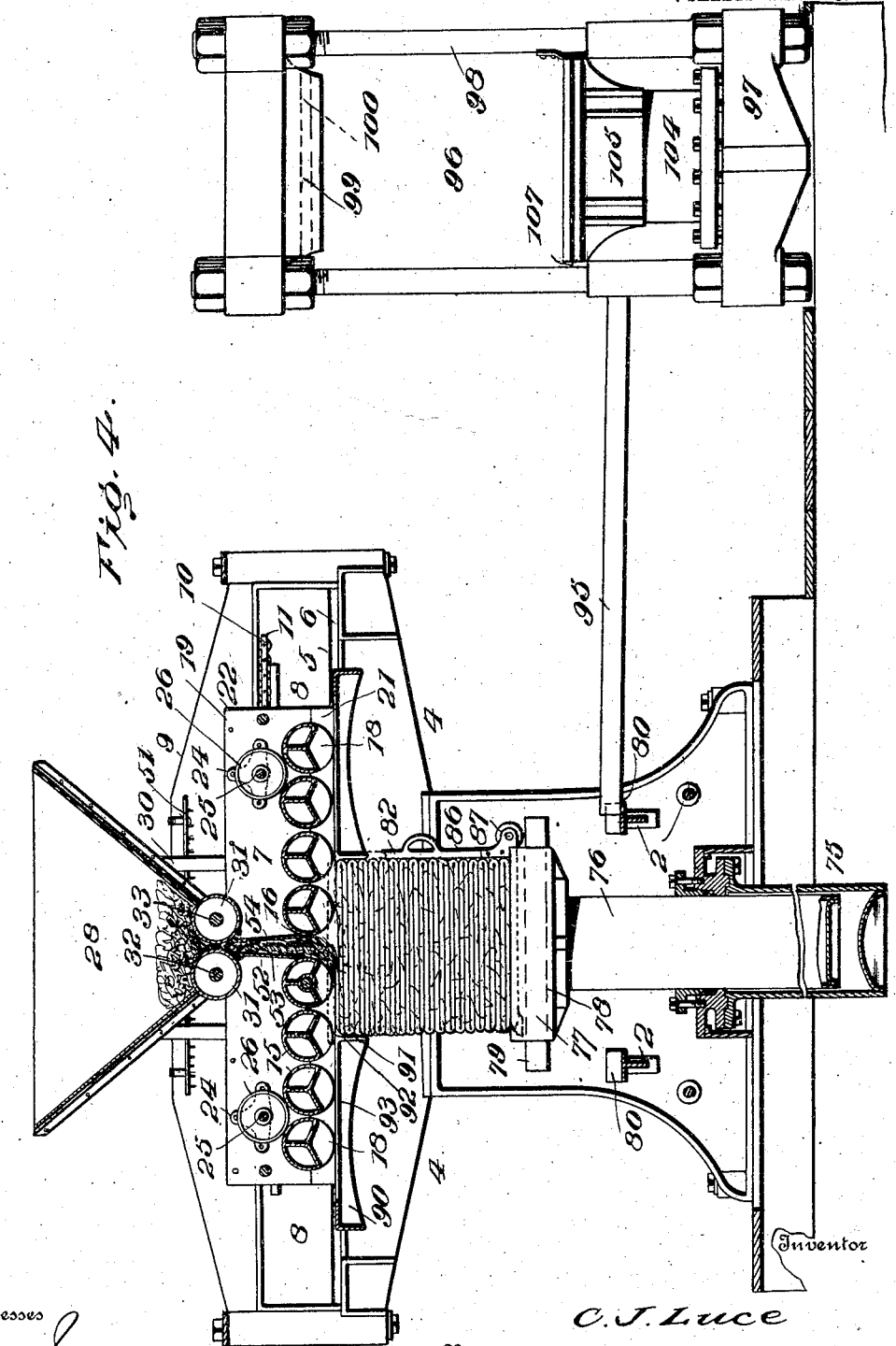

No. 785,068. PATENTED MAR. 14, 1905.
C. J. LUCE.
BALING PRESS.
APPLICATION FILED FEB. 27, 1904.
7 SHEETS—SHEET 6.
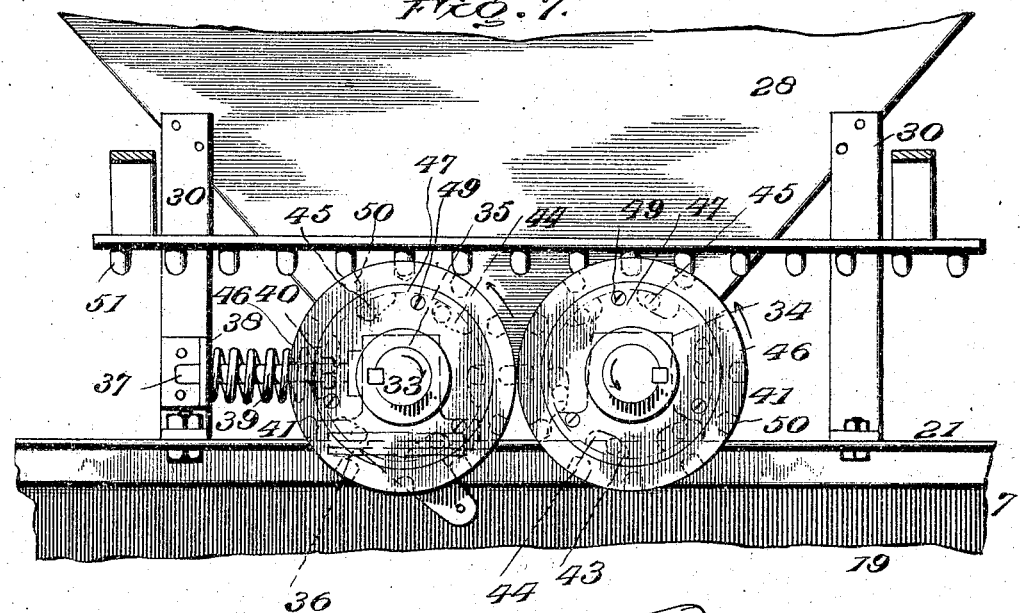
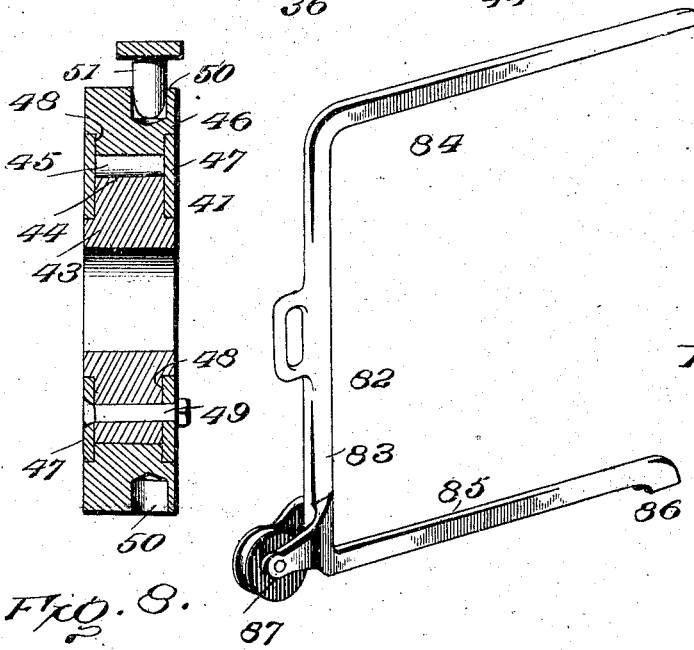
Inventor
C. J. Luce
By Stewart & Stewart
Attorneys
Witnesses

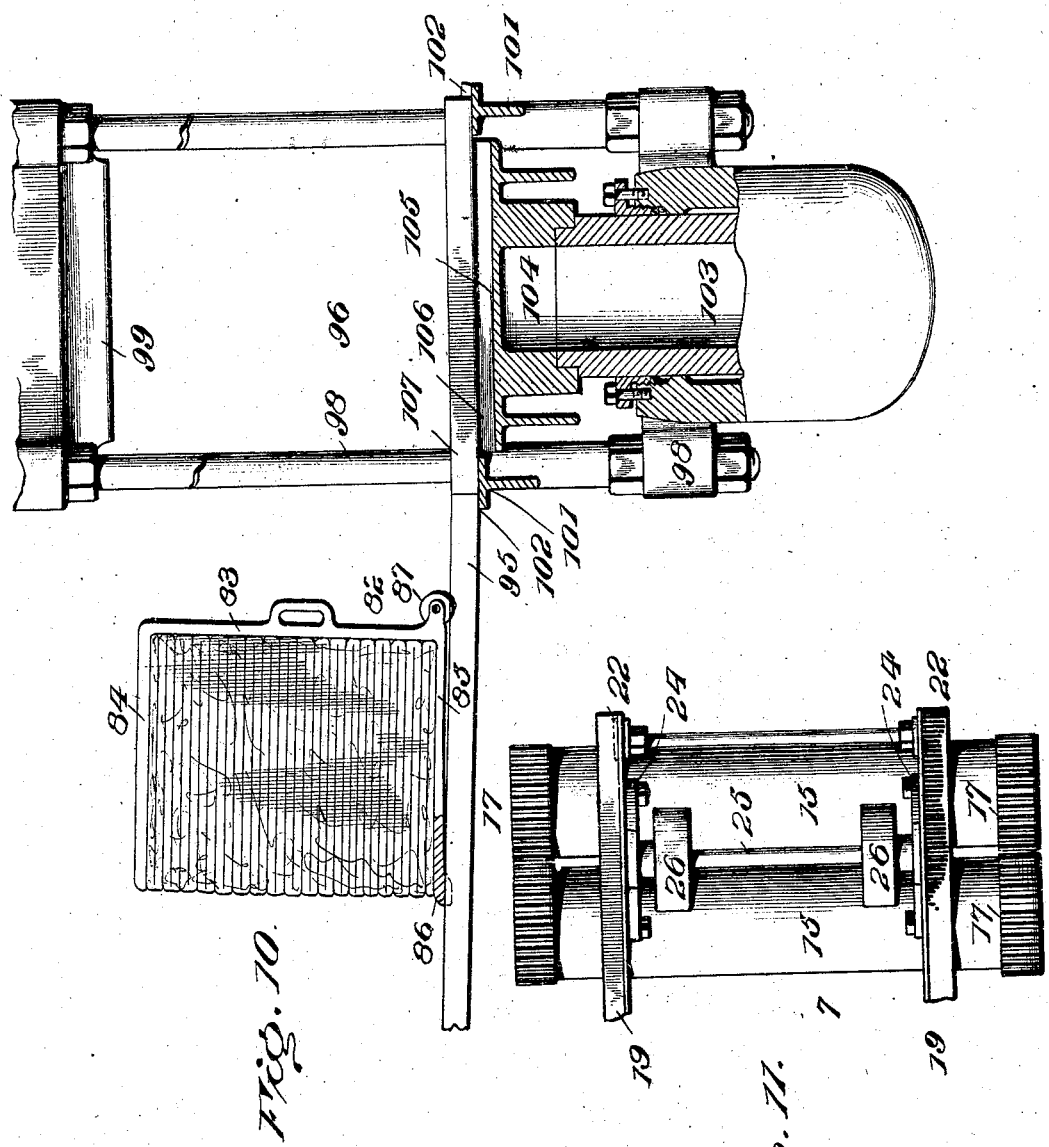

No. 785,068. Patented March 14, 1905.

UNITED STATES PATENT OFFICE.

CHARLES J. LUCE, OF NIANTIC, CONNECTICUT, ASSIGNOR TO LUCE COMPRESS & COTTON COMPANY, A CORPORATION OF DELAWARE.

BALING-PRESS.

SPECIFICATION forming part of Letters Patent No. 785,068, dated March 14, 1905.

Application filed February 27, 1904. Serial No. 195,579.

*To all whom it may concern:*

Be it known that I, CHARLES J. LUCE, a citizen of the United States of America, and a resident of Niantic, State of Connecticut, have invented certain new and useful Improvements in Baling-Presses, of which the following is a specification.

My invention relates to an improvement in baling-presses for cotton or other similar material of the class in which a continuous wad of cotton is first formed and then folded and laid down layer upon layer upon a follower and compressed while it is being laid down and held under pressure while the bale is being formed. Heretofore presses of this kind have been made; but they have been constructed to produce a bale having a density of from ten to fifteen pounds to the cubic foot and often served a very useful purpose.

I have discovered a fact which I believe to be new with me and which has been made the subject of an application, pending concurrently with this one, for a method of forming a bale, which application was filed on the 12th day of February, 1904, Serial No. 193,329. I have found by experience that if the bale be formed under the usual pressure used—say fifteen pounds density—it will expand as fast as it is made and can only be removed from the first press by being bound in suitable ties and then removed to a second press for further compression and that in the second press it will require a larger amount of power to give it the necessary secondary compression so as to bring the density up to about thirty pounds to the cubic foot.

I have found that if the primary baling operation is performed under a pressure sufficient to produce a density of about twenty-seven pounds to the cubic foot in my improved press when the bale is finished under this pressure it will have in great measure lost its power of expansion and may be bound up in suitable ties with ease, or it may be removed from the primary press without tying at all. Usually I merely place around it several U-shaped holders, by which it is held and in which it may be transported from the first to the second press. I have also found that when formed under a pressure such as will produce a density of twenty-seven pounds to the cubic foot in the primary press in the secondary press a density of from thirty to forty pounds may be attained with less than half the power necessary to be used if the primary density is that usually allowed—from fifteen to eighteen pounds. I do not know positively the cause of this phenomena; but I believe that it is due to the fact that the pressure necessary to produce twenty-seven pounds density in the first bale, applied, as I apply the pressure in my press, by a series of rollers which are caused to pass back and forth across the top of the layers of the continuous wad as they are folded and laid down upon each other, has the effect of expelling from the interstices between the fibers, and probably from the fibers themselves, practically all the air usually included in cotton or similar fibrous material when massed together.

It is undoubtedly true that so long as any considerable quantity of air is included in a bale the power necessary to compress that bale is the power required to compress not only the substance of the fiber, but also the air, because the air is contained within the interstices of the fibers in such a manner that it cannot escape and must be compressed. This compression involves a large expenditure of power and stores within the bale an amount of energy which gives to it a strong tendency to expand. It appears to be probable that if the air can be excluded, in the operation of forming the bale, both from the interstices of the bale between the fibers and also from the pores of the fibers the minimum of power will be required to compress the bale beyond the density given to it in the operation of forming it, because the power of resistance and the elasticity of the fibers themselves are greatly less than that of the air.

Figure 6:
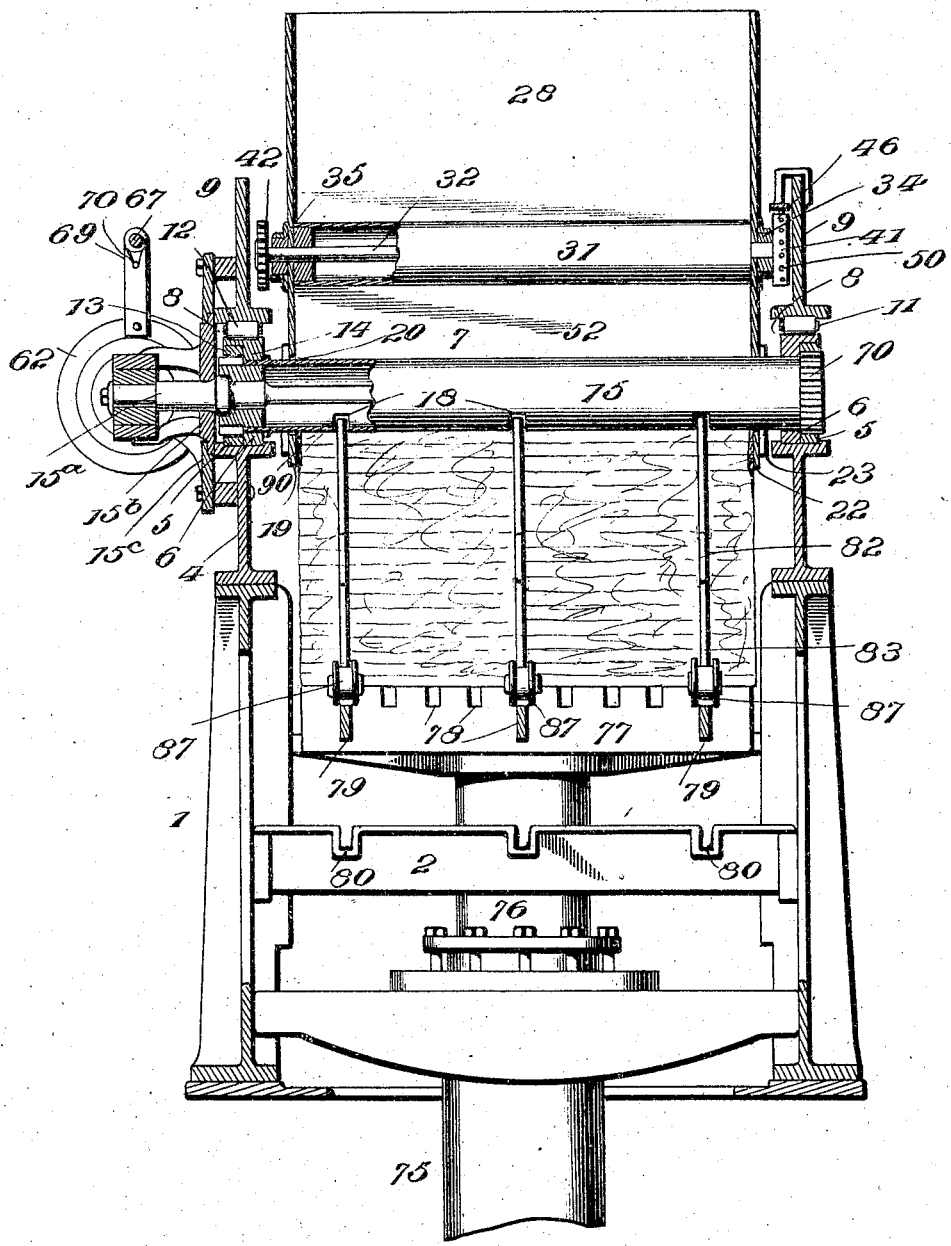

In the drawings, Figure 1 is a perspective view of my press constructed for the baling of cotton. Fig. 2 is a side elevation of the press from the opposite side to that shown in Fig. 1. Fig. 3 is a vertical section of one of the compression-rollers, showing its mounting and antifriction. Fig. 4 is a vertical elevation, partly in section, of my press from the side shown in Fig. 1. Fig. 5 is an enlarged vertical section of the same view shown in Fig. 4, but showing the bale finished and lowered away from the compression-rollers and held in holders in which it is transported to the secondary compress. Fig. 6 is an end elevation, partly in section, of the primary compress, showing the mode and mounting of the compression-rollers. Fig. 7 is an enlarged side elevation of the hopper and feed-rolls of the hopper through which the cotton is fed to the press. Fig. 8 is a vertical section of one of the hopper feed-rolls and clutches. Fig. 9 is a perspective view of one of the holders by which the bale is held and transferred from the primary to the secondary press. Fig. 10 is a detail view, partly in section, of the secondary press, showing how the bale is transferred to the secondary press. Fig. 11 is a top plan view of a part of the platen.

The same numerals represent the same parts in all figures.

In the drawings the numeral 1 indicates a base suitably braced by rods and cross-bars 2 2. The upper portion of the base extends laterally, as at 4, to form supports for the platen and the mechanism coöperating therewith. Mounted on the upper edge of the portion 4 of the base and rigidly positioned thereon are a track 5 and rack 6, over which the platen 7 travels. Above the base and spaced therefrom to form the slot 8 is a frame 9, bolted and braced to the portion 4 at its ends. The under side of this base forms a track on which rests an antifriction-carriage 10, composed of parallel bars 11 and rollers 12, while against the under side of this carriage bears a rack 13 and track 14. The lower face of the frame 9 and the upper face of the rack 13 are slightly grooved to receive the rollers 12, which grooves prevent the carriage and the rack from being laterally displaced. The rack 13 and the carriage 10 are independently mounted and move with the platen.

The platen 7 consists of a plurality of rollers 15, eight being illustrated in the drawings, with an opening 16 between the two center rollers. Each roller has a gear-wheel 17 rigidly fastened to each of its ends, the gears meshing with the stationary rack 6 and the movable rack 13, the rollers adjacent the racks bearing on the tracks 5 and 14. This construction prevents the weight of the platen being borne by the racks, which results in materially reducing the friction and precludes lateral displacement of the platen-rollers 15. The rollers are provided with a series of notches 18 18, and in the same radial as well as in the same horizontal plane. These notches stand opposite to a series of smaller notches 78 78 in the follower 77, which will be hereinafter described.

The sides 19 of the platen 7 are provided with openings 20, which are slightly larger, but through which the rollers 15 pass, and for convenience of manufacture the sides are made in sections 21 22, held together by cleats 23. Mounted in bearings 24, fixed to the sides of the platen, are two shafts 25 25, carrying rollers 26, which rest on the peripheries of the two rollers at each end of the platen. By this construction the sides of the platen-frame are wholly supported by the end rollers 15, and as the rollers 26 contact therewith obviously the friction between the parts is reduced to a minimum. A hopper 28 is supported on the sides 19 by irons 30, and in the lower portion of the hopper are a pair of feed-rolls 31, fixed on shafts 32 and 33, mounted on bearings 34 and 35. The bearings 34 are rigidly positioned, while the bearings 35 may slide in ways 36. Rods 37 project from these bearings and pass through guides 38 on the irons 30. Springs 39 are mounted on the rods, and each spring at one end bears against an adjustable collar 40 and at the opposite end against the guide 38. The bearings on each side are the same, so that in the event that the cotton in being fed to the platen is retarded the feeding action will be checked by the pressure on the roll overcoming the tension of the springs 39. On one end of each shaft 32 and 33 is mounted a clutch 41 and at the opposite end a gear-wheel 42, the latter meshing with its companion on the other shaft. Each clutch comprises a disk 43, provided with a series of peripheral inclined notches 44, in which are fitted rollers 45. Surrounding the disk is a rim 46, held to the disk by a pair of rims 47, seated in grooves 48 and fastened in position by bolts 49. The rollers 45 bear on the inner face of the rim 46, and if the latter is revolved in the direction of the shallow part of the notches 44 it opens the rollers between it and the disk, and as the latter is made fast to the shaft motion is imparted thereto. In the periphery of the rim are a series of notches 50 for the reception of pins 51, depending from the plate fixed on the frame 9. The clutches are made to operate in opposite directions, so that as the platen reciprocates the rollers will always revolve in one direction. A throat 52 is located between the rollers 31 and the rollers 15 of the platen and is made up of two members 53 and 54, the latter having a slight movement by being carried by a shaft fixed to lugs on the bearings 35, the rod passing through slots in the frame 19.

60 represents a steam-cylinder supported on the base portion 4, and 61 is a piston and rod coöperating therewith. The opposite end of the rod 61 is provided with a piston working in a governor-cylinder 62, which is also located on the base portion 4. A pipe 63 connects opposite ends of the cylinder 62 and has in it a controlling-valve 64. Fluid in the cylinder 62 is forced through the pipe 63 by the piston, and as its flow is controlled by the valve 64 the reciprocating action of the piston can be controlled.

One of the rollers 15 adjacent the opening 16 has extending from one side of it a trunnion 15ª, which passes through the slide 15ᵇ and is loosely connected at its outer end to a rod 61, by means of which motion is imparted to the platen. The slide 15ᵇ is mounted in guides 15ᶜ, fastened, respectively, to the frame 9 and the base portion 4 and on the outside of the gears 17.

66 indicates a suitable steam-chest and valve mechanism on the cylinder 60, the rod 67 of which passes freely through a post 68, mounted on the rod 61, and a guide 69 on the governor-cylinder 62. Stops 70 and 71 are mounted on the rod 67, and they are arranged in the path of the post 68 and are adapted to be struck thereby. The stops 70 and 71 are adjustable to vary the length of stroke given the reciprocating platen.

Steam being admitted to the steam-chest, the piston and the rod 61 are forced toward the left, Fig. 1, and when the end of the stroke is reached the post 68 strikes the stop 70 and changes the position of the valve in the steam-chest, which allows steam to act on the reverse side of the piston in the cylinder 60 and the movement of the platen is reversed, and when the post 68 strikes the stop 71 the position of the valve is again changed, and vice versa. The valve controlling the length of the stroke is so set that the reversal of motion of the roller-platen will take place at the instant at which the bite of the roller following the continuous wad—that is to say, a vertical plane passing through the axis of that roller—has reached a point about an inch and a half from the edge of the bale. The reversal of the motion of the platen at that point will leave the last inch and a half of the bale uncompressed by the roller following the wad and for a period of time will leave the wad which is being continuously fed down from the hopper through its throat under pressure. Relieved from that pressure on the under side and free to expand it will expand, and having done so, with the reversal of the motion of the roller-platen, the roller on the opposite side of the wad beginning to move toward the wad will fold the wad at the point at which it has expanded and lay it down upon the preceding layer. In that expanded condition as soon as the bite of this roller following the wad begins to compress that portion of the wad which has not expanded and to lay it down upon the bale already formed it will give it a maximum compression, and while it is being laid down upon the bale the pressure will be maintained upon it all the way from the hopper to the bale. The result of this relief of pressure at the instant of folding the wad will produce in the bale two soft sides in which the density of the wad will not exceed six or eight pounds to the cubic foot, in consequence of which fact the sides of the bale will be soft enough to be easily sampled by those desiring to determine the quality in the bale.

To maintain the uniform pressure upon the bale while the layers of cotton are being laid down, I use any well-known hydraulic mechanism, its pressure-head receiving an increment movement as the size of the bale increases. I have shown in a conventional manner a cylinder 75 containing a usual piston and rod 76, the upper end of the rod carrying the pressure-head or follower 77. The follower 77 has formed at its upper surface a plurality of grooves 78, and in certain of these grooves short sections of track 79 are adapted to rest during the formation of the bale. The braces 2 are provided with slots 80, which are in vertical alinement with the end of the track 79 and support the latter when the pressure-head is at its lowest point. The relative location of the bars and slots is such that the pressure-head when down will leave the tracks and the bale will be supported thereon.

The bale of cotton having been made of the desired size and density, I temporarily bind it with binders 82, each binder consisting of a vertical bar 83 and two horizontal bars projecting therefrom—an upper bar 84 and a lower bar 85. The lower bar 85 is formed at its outer end with a guide or angle 86 at its lower side and is provided at its juncture with a vertical bar 83 with a roller 87. I may use several such binders to hold the bale, and they may have longer or shorter arms. They may be constructed, as shown in Fig. 9, large enough to inclose the whole bale from side to side, or they may be made, as shown in Fig. 5, with their arms intended to be located opposite each other upon opposite sides of the bale.

In applying a binder the platen-rollers are turned so that their notches will be on their lower side opposite the top of the bale. The bars 84 and the holders may then be passed through these notches and the bars 85 through corresponding notches in the follower, the guide 86 and the roller 87 resting on the track 79. Thus when the pressure is relieved between the follower and the platen and the follower-platen drops below the tracks, which are meanwhile supported, the bale will be supported upon the holders and they upon the tracks and the bale held within the holders.

The mechanism thus far described is for the purpose of completing the first stage in the formation of a bale—that is to say, the semi-compressing and forming of a continuous wad of cotton and laying it down in folds under a strong folding pressure and compressing the folds into a preliminary bale without relieving the aforesaid pressure. The temporary binders are then placed in position, so that the bale may be removed to be further compressed. When cotton is introduced into the hopper 28 and it is fed between the rolls 31 31 to the throat, which converts it into a continuous semicompressed wad, its downward motion is continuous until the resistance offered below by the bale over which the wad is traveling is sufficient to stop its downward motion and hold it in a compressed condition while the feed-rolls 31 are allowed to slip. The feed of the upper rolls is faster than the drive of the platen upon the cotton in the throat, with the result that the cotton after passing through said rolls is constantly compressed and forced downward throughout its whole extent toward the follower, and an even downward pressure is maintained upon the cotton in the throat and below the same to the layers piled on the pressure-head at all times, except at the moment at which the direction of the motion of the roller-platen is changed. The cotton from the very beginning of the formation of the wad, which subsequently forms the bale, contributes to the desired result of excluding the air from the continuous wad and gives to the roller-platen less work to do in completing the compression.

Steam entering the cylinder 60 drives the rod 61 toward the left, as illustrated in Fig. 1, which, pushing on the trunnion of the roller-platen, causes its gear-wheel 17 to travel on the rack 6 and also imparts motion to the traveling rack 13, which in turn imparts a uniform revolving motion to the rest of the platen-rolls. The carriage 10 also travels with the platen to reduce the friction between the parts. As the platen moves toward the left the openings 50 in the rims 46 of the clutch 41 on the shaft 32 engage the pin 51 on the rack-bar and the rollers 45 are crowded against the disk 43 and rim 46, revolving the rollers 31. The rollers of the clutch on the shaft 32 being forced away from their disk its rim will revolve idly. Thus no cotton is fed through the opening 16 when the platen reaches the extreme end of its stroke, due to the fact that there is an interval when the clutches take hold and are released when no motion is imparted to their respective shafts. This action insures the bale being of uniform thickness throughout its whole area. During the operation of laying down the layers of cotton upon the bale should the resistance to the downward pressure of the wad upon the bale below exceed the friction between the rolls 31 and the wad the rolls will separate and slip on the cotton; but the pressure will remain the same until relieved from below, when the rolls will again come together and feed the cotton into the throat. As before stated, the piston and rod drives the platen to the left, and in so doing the continuous semicompressed wad of cotton is fed through the opening 16 of the platen and a thin layer is laid down and compressed into a bale. To confine the uppermost folds of the bale at the extreme ends of the reciprocation of the platen, I provide a platform 90, having an opening 91 approximately the size of the bale, and a depending flange 92 surrounds the opening and bears against the side of the bale. The flange 92 of the platform prevents the ends of the top folds from striking and getting out of alinement with each other. After a sufficient number of layers have been piled upon each other and compressed any appropriate mechanism may be employed to automatically stop the machine, if so desired, it being essential that the platen be stopped at such a point that the notches 18 will be in alinement adjacent the bale. The binders are now thrust through the slots 91 of the platform 90 and the notches 18 in the rollers and the opposite ends of the binders into the slot 78 in the follower, and the follower is lowered, so that the track 79 will be wholly supported in the notches 80 in the cross-bars 2. After a bale as thus described has been formed and the follower 77 has been lowered it causes the binders to be supported on the track 79, holding the bale within them. The bale is given a slight movement, and it slides along the inclined rest 95, leading to a supplemental press 96. The press 96 comprises a base 97, connected by standards 98 to a head-casting 99, the under side of which is provided with a series of grooves 100, which are in alinement with the follower 77 of the other press. Two cross-bars 101 connect the standards and are provided with notches 102 in alinement with the tracks 95, the latter being supported at one end within said notches. In the base is formed a cylinder 103, in which works a piston 104 of any suitable construction. The piston 104 carries at its upper end a pressure-head 105, provided on its upper surface with a series of grooves 106, corresponding with the grooves 100 in the casting 99. Several of the grooves receive short track-sections 107 in substantially the same manner as described in connection with the like feature of the follower 77. Normally the pressure-head 105 is dropped below the cross-bars 101, which leaves the tracks 107 supported in alinement with the tracks 95. The bale may now move down the tracks 95 and onto the tracks 107, the rollers 87 on the temporary binders permitting this to be readily done. After the bale which is at this time contained in the temporary binders is over the pressure-head and supported on the tracks 107 the pressure-head is moved upward. This causes the tracks 107 to drop into their grooves 106, and as there are grooves 106 on the pressure-head in alinement with the temporary binders on the bale the pressure will be exerted upon the bale. The grooves 100 in the head 99 receive the upper portions of the temporary binders. Consequently the bale will be compressed and allow the temporary binders to be removed. The bale is now confined between the pressure-head and the casing 99, and the pressure is applied to the piston 104, which compresses the cotton to the desired density. While this operation is going on another primary bale is being formed in the first-described press, so that two bales may be acted upon at the same time.

Where in the claims I use the expression "without relieving the pressure on the wad" or the expression "means for feeding the wad under the platen under a continuous pressure throughout its whole extent," I intend to convey that the material is maintained continuously under pressure, not necessarily under the same pressure, but continuously under a degree of pressure throughout its whole extent.

Having thus described my invention, what I claim as new, and desire to secure by Letters Patent, is—

1. In a baling-press, the combination with means for forming a continuous wad, of means for feeding the wad under pressure throughout its whole extent, means for forming the wad into a bale without relieving the pressure thereon, a press connected to the aforesaid means by tracks to give a final compression to the bale, temporary binders of permanent size and form adapted to embrace the bale and transport it on the tracks to the press for final compression, the said binders being removed before the final compression takes place.

2. In a baling-press, the combination with a platen, means to reciprocate the platen, of a pressure-head adapted to be pressed toward the platen, means for forming a wad of cotton under a constant forcing pressure, said cotton being laid down in layers by the reciprocation of the platen to form a temporary bale between the pressure-head and platen, binders adapted to be applied to the temporary bale, means to support the bale after the pressure-head is removed therefrom, a press adapted to give the bale its final compression, and means extending from the means which support the bale to the press for transferring the cotton to the press.

3. In a baling-press, the combination with means for forming a temporary bale, comprising a platen and a pressure-head, grooves formed in the pressure-head, tracks supported in the grooves, supports adapted to receive the tracks when the pressure-head is lowered, a press, tracks connecting the means for forming the bale and the press, said latter tracks being in alinement with the first-mentioned tracks, and means to compress the bale in the press.

4. In a baling-press, the combination with means for forming a temporary bale, comprising a platen and a pressure-head, tracks carried by the presure-head, means for separating the pressure-head from the tracks to support the bale on said tracks, a press, tracks connecting the means for holding the temporory bale and the press, said tracks being in alinement with the tracks on the pressure-head to transfer the temporary bale to the press, and means to operate the press.

5. In a baling-press, the combination with a platen, means for reciprocating the platen, means to adjust the length of stroke of the platen, and means coöperating with the platen to form a bale.

6. In a baling-press, the combination with a reciprocating platen composed of a plurality of rollers, means for revolving the rollers, a piston-rod connected to a roll, means for adjusting the length of stroke of the platen, and means coöperating with the platen to form a bale.

7. In a baling-press, the combination with a reciprocating platen composed of a plurality of rollers, means for revolving the rollers, notches formed in a plurality of the rollers and extending only part way around the rollers, a pressure-head, and binders adapted to pass through the notches when they are in alinement and over the bale for holding said bale.

8. In a baling-press, the combination with a reciprocating platen carrying a roller formed with an opening extending only part way around the roller, of a pressure-head, and binders adapted to pass through the opening and over the bale at the top and between said bale and the pressure-head when the opening stands over the bale.

9. In a baling-press, the combination with a reciprocating platen carrying a roller formed with an opening extending only part way around the roller, of a pressure-head formed with corresponding opening, and binders adapted to be passed through the opening in the roller of the platen and the pressure-head when the opening in the roller stands over the bale.

10. In a baling-press, the combination with a platen formed with openings, of a pressure-head formed with corresponding openings, temporary binders adapted to be passed through the opening in the platen and the pressure-head, a track, a press, a portion of the track being carried by the pressure-head and the press, the tracks being brought into alinement for transferring the bale to the press.

11. In a baling-press the combination with a platen formed with openings, of a pressure-head formed with corresponding openings, and temporary binders of permanent form adapted to be passed through the openings in the platen and pressure-head and engage the bale.

12. In a baling-press, the combination with a platen formed with openings, of a pressure-head formed with corresponding openings, of a temporary binder in the form of three sides of a rectangle adapted to be passed through the openings in the platen and pressure-head and engage the bale.

13. In a baling-press, the combination with a frame, a reciprocating platen comprising sides and a series of rolls bearing on the frame, shafts supported by the sides, rolls on the shafts which contact with the rollers of the platen, and feeding mechanism carried by the platen, the weight of the sides of the platen and the feeding mechanism being supported by the rolls resting on the rollers.

14. In a baling-press, the combination with a frame, a reciprocating platen comprising rollers and sides through which the rollers pass and an element supported by and revolved by the rollers to relieve the rollers of the weight of the sides.

15. In a press, the combination with a frame, a reciprocating platen comprising a plurality of rollers, gears on the rollers, a stationary rack, a movable rack, the two racks being engaged by the gears and mechanism connected to a roller for reciprocating the platen.

16. In a baling-press, the combination with a platen comprising a series of rollers, gears on the rollers, a stationary rack, a stationary track adjacent the rack and on which the rollers are supported, a movable rack, an antifriction device to relieve the friction of the movable rack, and means for reciprocating the platen.

17. In a baling-press, the combination with a platen comprising a series of rollers, gears on the rollers, a stationary rack, a stationary track adjacent the rack and on which the rollers are supported, a movable rack, having a track adjacent thereto which bears on the rollers, the two tracks being in contact with the rollers, and means for reciprocating the platen.

18. In a press, the combination with a platen composed of a series of rollers, and notches formed in the rollers, the notches in the rollers being located so that they are all in alinement at a predetermined point, a pressure-head, the notches permitting of the introduction of a binder.

19. In a baling-press, the combination with a platen composed of a plurality of rollers, notches formed in the rollers, the notches being located so as to be in alinement with each other at a predetermined point, a platform provided with an opening in which the bale fits, slots in the platform which are coincident with the notches in the rollers, a pressure-head, the notches in the rollers and the slots in the platform permitting of the introduction of a binder.

20. In a baling-press, the combination with a platen, and means coöperating therewith for temporarily forming a bale, of a frame, tracks supported by the frame, a pressure-head having grooves formed in it to receive the tracks, a press to finally compress the bale, tracks supported by the press, a pressure-head in the press, grooves formed in said pressure-head to receive the tracks, tracks supported in alinement with the aforesaid track, the pressure-heads when compressing bales lifting the tracks adjacent thereto, for the introduction of a binder when the bale is temporarily formed, and permitting of the removal of said binder when the final compression takes place.

21. In a press, the combination with a platen provided with a series of notches, a pressure-head provided with a series of grooves, tracks carried by the pressure-head, while compressing a bale, binders adapted to prevent longitudinal expansion of the bale supported by the rail and provided with a roller, said binder embracing the bale, a press, and an inclined track arranged in alinement with the track when the pressure-head is lowered to transport the bale to the press by gravity on the binders.

22. In a baling-press, the combination with means for forming a continuous wad, of means for feeding the wad under continuous pressure throughout its whole extent, means for forming the wad into a bale of predetermined density without relieving the pressure on the wad, means for temporarily holding the bale to prevent longitudinal expansion of the bale, means for giving the bale a final compression to increase its density, and means for transferring the bale from where it received the predetermined density to the means for increasing its density.

23. In a baling-press, the combination with a reciprocating platen having an aperture therein, of means to reciprocate said platen, means for forming a wad under pressure, means for feeding the wad through said aperture and under said platen under continuous pressure throughout its whole extent, said platen operating by its reciprocation to form the wad into a bale having a predetermined density, a press for increasing the density of the aforesaid bale, and means for transferring the bale to the press.

Signed by me, at New York city, county and State of New York, this 24th day of February, 1904.

CHAS. J. LUCE.

Witnesses:
PAUL BONYNGE,
EMMA W. FINLAYSON.